Dec. 22, 1964  G. H. SMITH ETAL  3,162,286
CLUTCH WITH TORSION BAR ENGAGING SPRINGS
Filed Nov. 6, 1961

Inventors:
Grant H. Smith and
Romas B. Spokas
By: Joseph W. Malleck Atty.

3,162,286
CLUTCH WITH TORSION BAR ENGAGING
SPRINGS
Grant H. Smith and Romas B. Spokas, Rockford, Ill., assignors to Borg-Warner Corporation, Chicago, Ill., a corporation of Illinois
Filed Nov. 6, 1961, Ser. No. 150,499
6 Claims. (Cl. 192—89)

This invention relates to clutches and more particularly to actuating assemblies for clutch devices for providing clutch engagement.

It is a primary object of this invention to provide an improved actuating assembly for a clutch device, particularly of the friction disc type, which is considerably more simple and compact than devices known in the prior art.

Another object of this invention is to provide a unique actuating assembly for a friction disc type clutch device which provides for greater and more effective utilization of available spring material for engaging the clutch device.

Still another and more specific object of this invention is to provide a clutch actuating assembly which provides a unique arrangement of torsion elements adapted to cooperate for procuring unprecedented advantages in simplicity and compactness of assembly.

Figure 1:
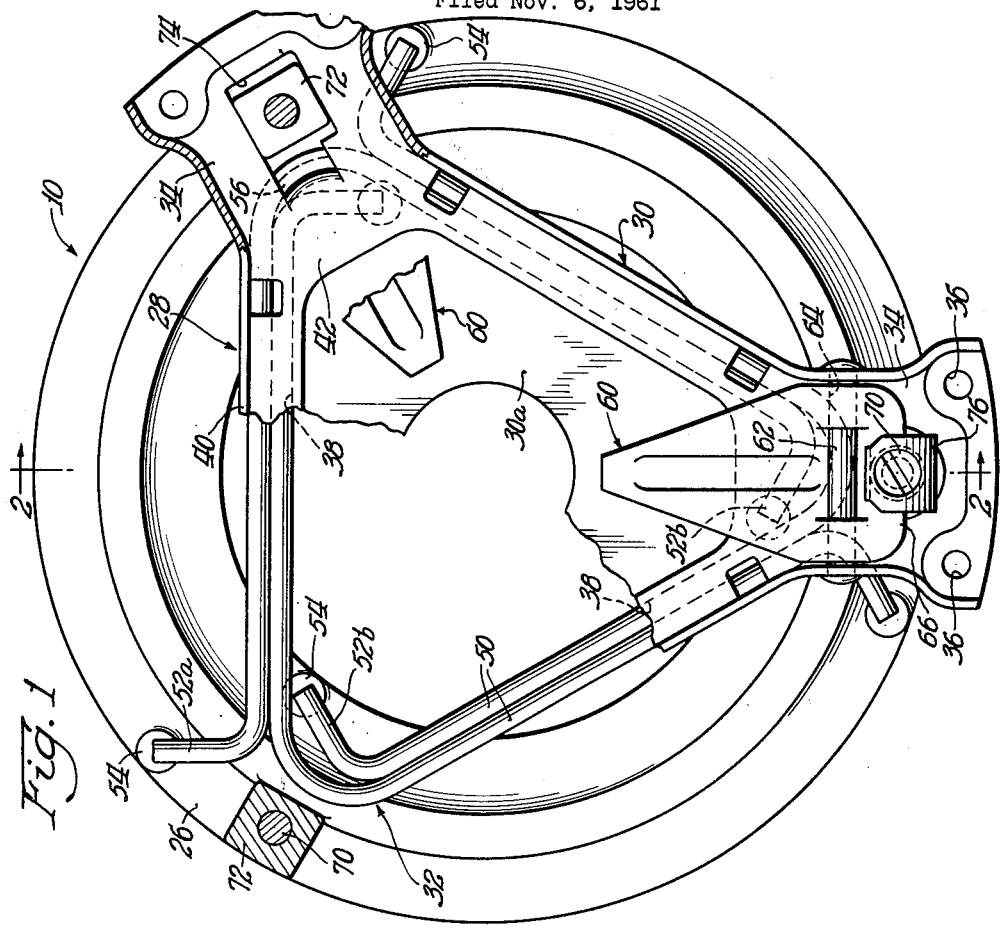
Figure 2:
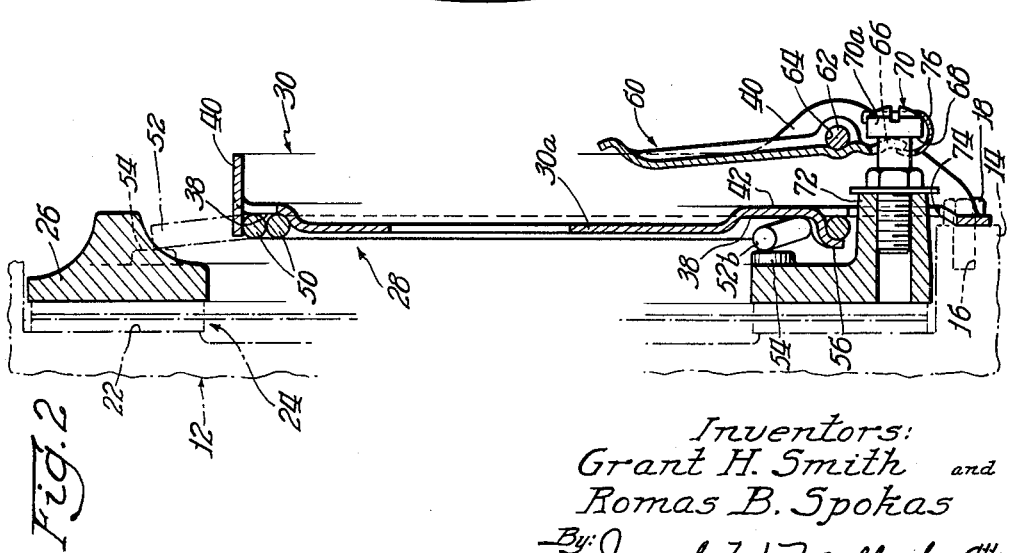

Other objects and features of the invention will be readily apparent to those skilled in the art from the specification and appended drawings illustrating a certain preferred embodiment, in which:

FIGURE 1 is a front elevational view of a clutch device constructed in accordance with the present invention and having certain portions thereof broken away to illustrate the clutch actuating assembly of this invention; and FIGURE 2 is a fragmentary sectional view taken substantially along line 2—2 of FIGURE 1.

Referring to the drawings and more particularly to FIGURE 1, the clutch within which the actuating assembly of this invention cooperates, is generally indicated by reference numeral 10. The clutch comprises a fly wheel 12 which may be driven by a vehicle engine in a conventional manner. The fly wheel 12 is shown as being of the "pot" type and has an axially extending peripheral flange 14 provided with a plurality of circumferentially spaced threaded bores 16 for reception of cap screws 18 which secure in the position illustrated a bracket 30, as will be described. The fly wheel 12 is provided with an annular flat surface 22 against which a friction driven assembly 24 is brought to bear as will be described hereinafter. The fly wheel may have a central opening in which is piloted a bearing adapted for journaling a driven shaft therein (all of which is not shown). The friction driven assembly 24, being of the friction disc type, is illustrated in FIGURE 2 as disposed adjacent the flat surface 22 of the fly wheel and is adapted to be gripped between a pressure plate member 26 disposed on the side of the friction driven assembly opposite from that of the fly wheel surface 22.

The means with which this invention is particularly concerned, is directed to an actuating assembly, generally indicated 28, for moving said pressure plate 26 against the friction driven assembly 24 for providing clutch engagement. The actuating assembly 28 generally comprises a bracket 30 and a plurality of resilient members 32 adapted to be mounted between said bracket 30 and the pressure plate 26.

Turning now more particularly to the bracket 30, it is formed as substantially a plate having a generally triangular plan configuration. At each corner of the triangular configuration is provided an extended lip portion 34 which is adapted to be secured to the outer flange 14 of the fly wheel by the suitable fasteners 18 and which are adapted to extend through openings 36 formed in each lip 34. A triangularly shaped guideway, generally indicated 38, is provided on one side of the bracket to receive and position the resilient means 32. The guideway 38 is formed with marginal areas 42 of the triangular bracket web 30a being recessed in a direction away from the side at which the fly wheel is disposed. At the peripheral edges of the bracket web 30a is formed an axially extending flange 40 which extends about the entire periphery of the web and along the sides of the lip portions. The flange 40 cooperates with the recessed margins in defining the guideway 38 within which the principal body portion of resilient means 32 is received.

The resilient means 32 more particularly comprises a plurality of V-shaped torsion elements 50. The torsion elements may be formed of common cylindrical rod or bar stock and is preferred because of the unusually satisfactory results from both the point of view of economy of manufacture and performance. The arms of each torsion element are adapted to fit within the guideway 38 surrounding the triangular shaped web of the bracket and have the vertex of the V of each torsion element stationed within a corner of the bracket web configuration. The ends of the torsion elements are turned outwardly with respect to the leg of each V and adapted to engage bearing surfaces 54 formed at a plurality of stations about the pressure plate member. The preferred embodiment here employs a plurality of three torsion elements arranged in nested fashion so that one end 52a of each element engages an intermediate area or bearing surface 54 of the pressure plate member and the other end 52b of the torsion element engages a more inwardly spaced bearing area 54 of the pressure plate area. To accomplish this, the torsion elements each have their vertex placed at one corner of the triangular shaped bracket web 30a with one leg disposed inwardly of one adjacent torsion element leg and its other leg disposed outwardly of another adjacent torsion element leg.

To adequately cradle the vertex of each torsion element, since the flange 40 extends along the periphery of the lip portion 34 out of juxtaposition with the torsion elements, fingers 56 are struck out of the lip portions to act as an auxiliary guide cooperating with the recessed margins.

The torsion elements are calibrated and arranged to provide a predetermined amount of clutch engaging pressure against the pressure plate member 26 and are adapted to react against the bracket in a manner whereby the resiliency is provided by twisting motion of the rather elongated legs of the V-shaped torsion elements.

The release mechanism for the clutch device comprises generally a plurality of release levers 60 which are mounted upon pivot pins 62 journaled in openings 64 provided in the flanges 40 flanking the margins of the bracket lip portions 34. An outer end 66 of each of the release levers is adapted to engage an inner shoulder 68 provided on cap screws 70. A cap screw is provided for each of the release levers and is secured within a lug 72 formed on the intermediate circumference of the pressure plate member 26 and which lugs and screws extend through openings 74 provided in the bracket lip portions. The outermost end 66 of each of the release levers are maintained in engagement with the said shoulder 68 by means of a resilient clip 76 mounted about the head 70a of each cap screw.

The release levers 60 operate in a known manner whereby actuation of their inner ends by a suitable means, i.e., a bearing release collar, the levers are caused to urge the pressure plate outwardly (to the right in FIG. 2) and away from the friction disc in a manner to overcome the effect of the torsion elements for disengaging the clutch device.

It may be readily seen that by utilization of this unique clutch actuating assembly, a more economical assembly is provided since a more simply constructed resilient means is employed and which affords greater resiliency for a given amount of spring material. Additionally, the great compactness provided by the assembly and as shown by FIGURE 2, is in direct contrast to the available known devices which are of the coiled spring engaged type.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

We claim:

1. A clutch device of the friction type having an annular drive member, a driven plate and a pressure plate, the drive member and pressure plate being adapted to frictionally engage the driven plate therebetween, said device comprising a clutch actuating assembly, said assembly comprising a bracket secured to said annular drive member and disposed adjacent one side of said pressure plate opposite the driven plate, a plurality of torsion elements disposed between said bracket and said pressure plate for resiliently urging said pressure plate toward said driven plate, said torsion elements each having an effective torsion length greater than any chord of a circle enclosing said pressure plate, and a plurality of levers pivotally mounted on said bracket and adapted to move said pressure plate in a direction to overcome the effect of said torsion elements and release said pressure plate from the driven plate.

2. A clutch device as in claim 1, in which said torsion elements each comprise a metallic bar formed generally in a V configuration with the end of each arm and of the V disposed at an angle with respect to said arm and adapted to provide bearings in engagement with said pressure plate.

3. A clutch device of the friction disc type, comprising in combination: a flywheel adapted to be driven by a suitable power source; pressure plate having a plurality of circumferentially spaced lugs extending outwardly to one side thereof; a driven shaft; a driven plate disposed between said pressure plate and said flywheel and being splined to said driven shaft; a bracket secured to the outer periphery of said flywheel and disposed adjacent the side of said pressure plate opposite the driven plate, said bracket having a triangularly shaped web with mounting lips provided at the corners of the triangle, said lips being secured to the outer periphery of said flywheel, said bracket web having a central opening receiving said driven shaft and a plurality of circumferentially spaced openings adapted to receive said pressure plate lugs extending therethrough; a plurality of elongated torsion elements formed with portions lying along more than one side of said triangularly shaped web and resiliently acting between said bracket and said pressure plate for normally urging said pressure plate toward said driven plate; and release means adapted to overcome the effect of said torsion elements for disengaging said clutch.

4. A clutch device as in claim 3 in which said bracket has margins recessed outwardly from said pressure plate and have one or more fingers provided at the outer periphery of said recessed margins adapted to cooperate with said recessed margins for forming a receptacle within which said torsion elements may seat, and said pressure plate having a plurality of raised bearing areas against which the ends of said torsion elements may engage.

5. A clutch device as in claim 3 in which said torsion elements are three in number and are arranged in overlapping fashion to form a closed triangle and are adapted to fit along the margins of said web.

6. A clutch device as in claim 3 in which said bracket has flanges each provided with an opening therein, and said release means comprising a plurality of shafts adapted to provide fulcrums with each shaft having its ends received in openings of said bracket flanges; and levers pivotally mounted on said shafts and adapted to move said pressure plate in a direction to overcome the effect of said torsion elements in disengaging said clutch.

References Cited in the file of this patent

UNITED STATES PATENTS

| | | |
|---|---|---|
| 2,183,000 | Wolfram | Dec. 12, 1939 |
| 2,195,664 | Wolfram | Apr. 20, 1940 |
| 2,405,357 | Jarrett | Aug. 6, 1946 |

FOREIGN PATENTS

| | | |
|---|---|---|
| 254,593 | Great Britain | July 8, 1926 |